US006813047B1

(12) United States Patent
Murbach

(10) Patent No.: US 6,813,047 B1
(45) Date of Patent: Nov. 2, 2004

(54) DIGITAL IMAGE PROCESSING SYSTEM FOR THE MANUFACTURE OF PHOTOGRAPHIC PRINTS

(75) Inventor: Hans Peter Murbach, Zurich (CH)

(73) Assignee: Gretag Imaging AG, Regensdorf (CH)

( * ) Notice: Subject to any disclaimer, the term of this patent is extended or adjusted under 35 U.S.C. 154(b) by 0 days.

(21) Appl. No.: 09/121,111

(22) Filed: Jul. 23, 1998

(30) Foreign Application Priority Data

Jul. 24, 1997 (EP) .............................. 97112762
Feb. 4, 1998 (EP) ............................ 98101907

(51) Int. Cl.[7] .............................................. G03F 3/10
(52) U.S. Cl. ................. 358/527; 358/537; 348/96; 348/97; 396/311; 386/46; 386/95
(58) Field of Search ................. 358/527, 537, 358/501; 348/96, 97; 396/311; 386/46, 95, 124

(56) References Cited

U.S. PATENT DOCUMENTS

| | | | | |
|---|---|---|---|---|
| 4,636,845 A | * | 1/1987 | Alkofer | 358/80 |
| 4,891,634 A | * | 1/1990 | Ina et al. | 340/723 |
| 5,119,125 A | | 6/1992 | Kraft | |
| 5,365,353 A | | 11/1994 | Kraft | |
| 6,243,171 B1 | * | 5/2001 | Haneda | 358/1.15 |

FOREIGN PATENT DOCUMENTS

| | | |
|---|---|---|
| JP | 07111628 | 4/1995 |
| JP | 08211497 | 8/1996 |
| JP | 09034038 | 2/1997 |
| JP | 09055834 | 2/1997 |

\* cited by examiner

Primary Examiner—Kimberly Williams
Assistant Examiner—Negussi Worku
(74) Attorney, Agent, or Firm—Burns, Doane, Swecker & Mathis, L.L.P.

(57) ABSTRACT

A digital image processing system for the manufacture of copies of originals on photographic print material includes an input device for the registration of digital image data from an input medium which represent the prints to be produced, especially from a developed photographic film, as well as the accompanying data associated with the image data, a data storage for the temporary storage of the registered and possibly processed image data and the accompanying data, an output device for output of the image data onto an output medium, especially a photographic print material, and a control device, which controls and connects the input device, the data storage and the output device, and administers and controls the data flow between these devices according to the accompanying data associated with the image data.

32 Claims, 15 Drawing Sheets

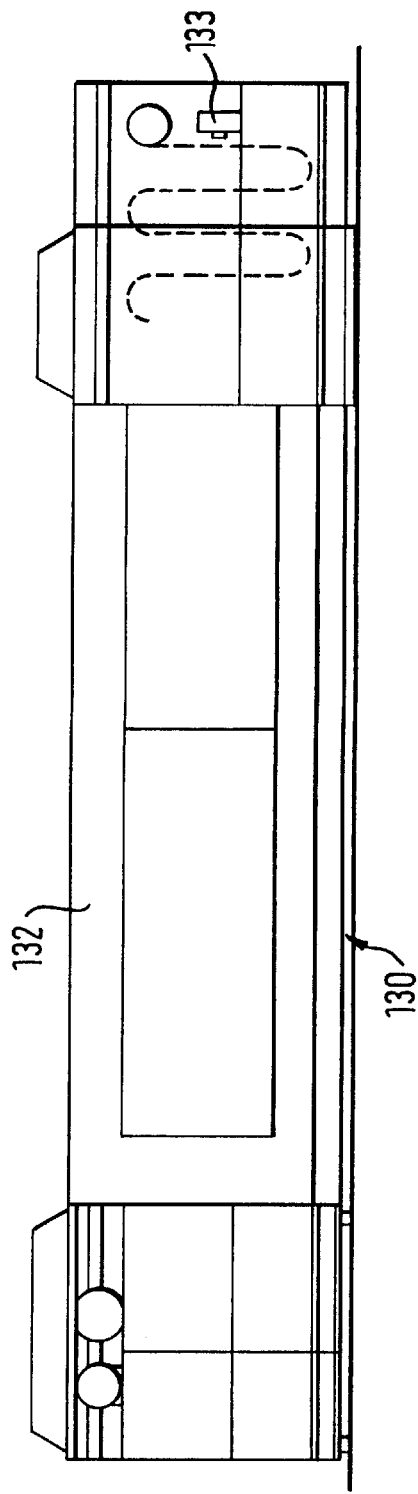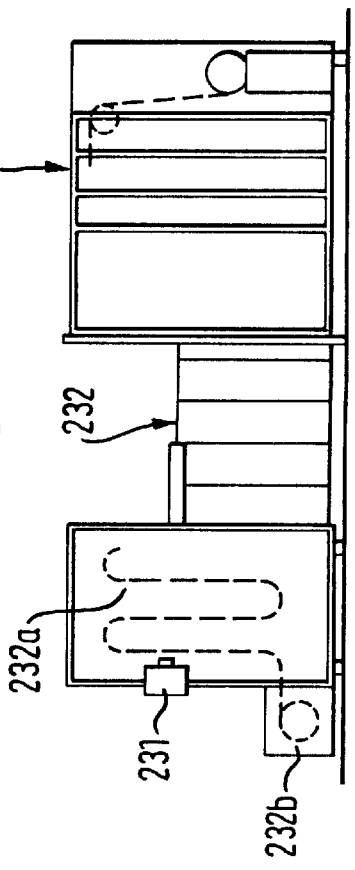

DIGITAL IMAGE PROCESSING SYSTEM FOR THE MANUFACTURE OF PHOTOGRAPHIC PRINTS

FIELD OF THE INVENTION

The invention relates to a digital image processing system for the manufacture of photographic prints. In particular, the invention relates to a system for the manufacture of copies of originals on photographic print material.

BACKGROUND OF THE INVENTION

Conventional systems for the manufacture of photographic prints typically include the following components:
- a preparation station wherein exposed films are removed from the cartridges containing them and, if applicable, spliced together to a long strip and wherein order-specific accompanying data are entered into the system,
- a film processor for the developing and drying of the films,
- a scanner which photoelectrically scans the individual images (originals) present on the developed films,
- an analog-optical or digital exposure device, which projects the image information from the originals onto photographic print material, normally photographic print paper,
- an exposure processor which processes the scanning data recorded by the scanner into exposure data and controls the exposure device therewith,
- a paper processor for the development and drying of the photographic print material exposed in the exposure device, and
- a terminal processing station wherein the developed films and the associated copies for each order are combined and, if applicable, packaged.

The film processor can be designed to either process individual films or to process several films spliced together in a long strip. The scanner and the exposure processor are normally combined with the exposure device to an apparatus unit which is usually designated a printer. The printer, or the exposure device contained therein, can be designed for the processing of individual original pictures, individual films, or spliced film strips, as well as for the processing of individual sheets or long strips of print material. The exposure device can project the originals analog-optically (photographical) onto the print material or can project an image onto the copy material based on the image information data produced by the scanner. The individual components of the systems can be wholly or partially separated or can be combined with components which proceed or follow in the process flow. The transport of films and printing material between separate individual components is carried out batchwise by way of appropriate transport means or manually. With coupled components, the transport of films and printing material from one to the respectively following component is timed, whereby the individual components, within certain limits, can be disconnected with respect to speed by suitable film or paper buffers.

In such systems, the individual process steps are product driven in that the connection of the individual components of the system is determined and controlled by the developed films and the exposed printing material, independent of whether the system represents a mini lab or a high capacity installation used in large-scale labs. This product-controlled connection dictates the sequence and the speed of the individual process steps. In the interest of the highest possible efficiency of the total system, these systems require careful preparation and planning of the order processing, which includes, for example, the sorting of orders according to film types, the photographic printing material to be used, etc. The requirement for preparation and planning in the processing of an order is disadvantageous in that it limits the flexibility and degree of freedom of the order processing in the practical operation.

SUMMARY OF THE INVENTION

The present invention is now supposed to provide a system for the production of prints, wherein this disadvantage of prior systems is avoided and which allows the processing of any orders without prior planning, within the limits set by the system control components.

The solution to this object of the invention is achieved in a digital image processing system for the manufacture of prints, especially for the manufacture of copies of originals on photographic printing material, comprising an input device for the registration of digital image data from an input medium which represent the prints to be manufactured, especially a developed photographic film, as well as accompanying data associated with the image data, a data storage for the temporary storage of the registered and possibly processed image data and the accompanying data, an output device for the image data onto an output medium, especially a photographic print material, and a control device for controlling and connecting the input device, the data storage and the output device, the control device managing and controlling the flow of data between said devices according to the accompanying data associated with the image data.

It is one of the principal aspects of the present invention that the image data which represent the pictures to be produced are temporarily stored together with the accompanying data in a data storage of the type of a databank whereby the control device manages the stored data and controls the data flow between the data storage and the input device and the output device according to the order. In this way, the input device and the output device are uncoupled relative to the product and the input of the image accompanying data from the input device into the data storage can be carried out independent of the output of the data to the output device. This allows operation of the input and output devices at different speeds which are optimally adapted to the respective process. Moreover, it is possible to physically separate the input and output devices, which further increases the flexibility of the system and the processing steps.

In a practical embodiment of the system in accordance with the invention, the input device has at least one scanning device for the image-based photoelectric scanning of physical originals and for the production of image data which present the originals. Furthermore, the output device includes at least one colour printer or a digital exposure device for a picture-based exposure of the image data stored in the memory onto a photographic printing material. In that embodiment, the system is adapted for the production of photographic copies of a physical original, typically the individual pictures of a developed photographic film. The digitizing of the originals and the intermediate storage of the image data in the data storage obviates the otherwise conventional physical intermediate storage or buffering between the respective components, which reduces cost and space requirements.

In a further, especially practical embodiment of the system in accordance with the invention, the input device has at least one input module which cooperates with the control device and has a development device for photographic films as well as a scanning device that is combined therewith into a physical unit or integrated thereinto for the picture-by-picture photoelectric in line scanning of developed films and for the production of image data which represent the originals on the films. The output device further includes at least one output module cooperating with the control device and having a developing device for photographic print material as well as a digital exposure device combined therewith into a physical unit or integrated thereinto for the picture-by-picture in line projection of the image data temporarily stored in the data storage onto the still undeveloped photographic print material. In this embodiment, the system is suitable for the production of photographic prints of individual images on photographic films. In contrast to conventional systems, however, a printer in the classical sense is missing, its functions being divided between the individual input and output modules and integrated therein. By simultaneously using several input and output modules, which, for example, can be adapted for different film formats, film types and printing materials, it is possible to carry out the most diverse printing orders without preparatory planning and in any sequence. Furthermore, the control device can optimize the capacity of the individual modules and thereby increase the total efficiency of the system.

BRIEF DESCRIPTION OF THE DRAWINGS

The invention is further described in the following with reference to the drawing. It shows:

FIG. 3 a basic sketch of an input module;

FIG. 4 a basic sketch of an output module;

DETAILED DESCRIPTION OF THE PREFERRED EMBODIMENT

Figure 1:
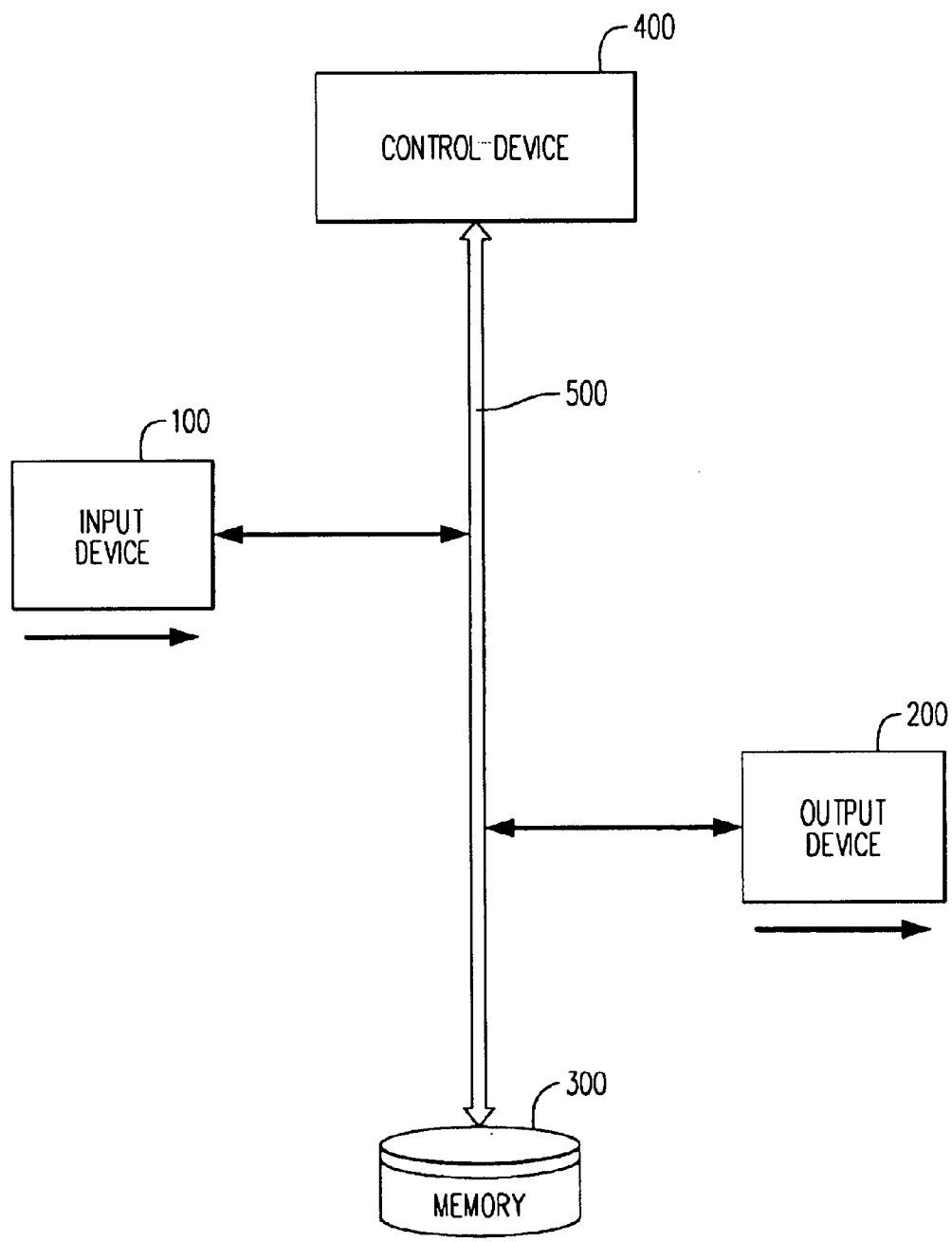
FIG. 1 a general principal schematic diagram of the system in accordance with the invention.

The prints manufacturing system shown in FIG. 1 in its most general form includes an input device 100, an output device 200, a data storage or memory 300, a control device 400 and a data and control bus 500 to which the devices 100, 200, 400 and the memory 300 are connected and which links these devices and the memory.

The input device 100 serves for the recording of digital image data representing the prints to be manufactured from an input medium, as well as for the recording of accompanying data associated with the image data. For example, the input device 100 can be designed as a scanning device for the picture-by-picture, photoelectric scanning of physical originals as input medium and for the generation of image data representing the originals, and a console or input station for the input of order-specific accompanying data. Accompanying data are understood here and in the following to be order-specific data (for example, order number, number of picture fields to be copied, number and format of the copies to be made, surface quality of the photographic print material, desired output medium, possible corrections, etc.).

The memory 300 is used for the temporary storage of the image data recorded by the input device 100 and the associated accompanying data; it can be organized in the form of a databank, for example.

The output device 200 releases the image data temporarily stored in the memory 300 to an output medium. For example, the output device can be a digital exposure device (for example, a laser exposure device, or CRT exposure device) for the picture-by-picture projection of the image data onto a photographic print material as output medium. Alternatively, the output device 200 can also be realized in the form of a colour printer of sufficiently high resolution (for example, a laser printer or an ink jet printer), whereby the output medium is then a paper or other substrate suited for this purpose.

The control device 400 is connected by way of the data and control bus 500 with the input device 100, the output device 200 and the memory 300, controls these devices and the memory, and administers and controls the data flow between these devices and the data storage order oriented and in accordance with the accompanying data associated with the image data. The control device 400, the data and control bus 500 and the memory 300 are represented by an appropriately programmed digital processor and the input device 100 and the output device 200 form peripheral units and are connected to the processor at suitable interfaces, which are not illustrated.

Figure 2:
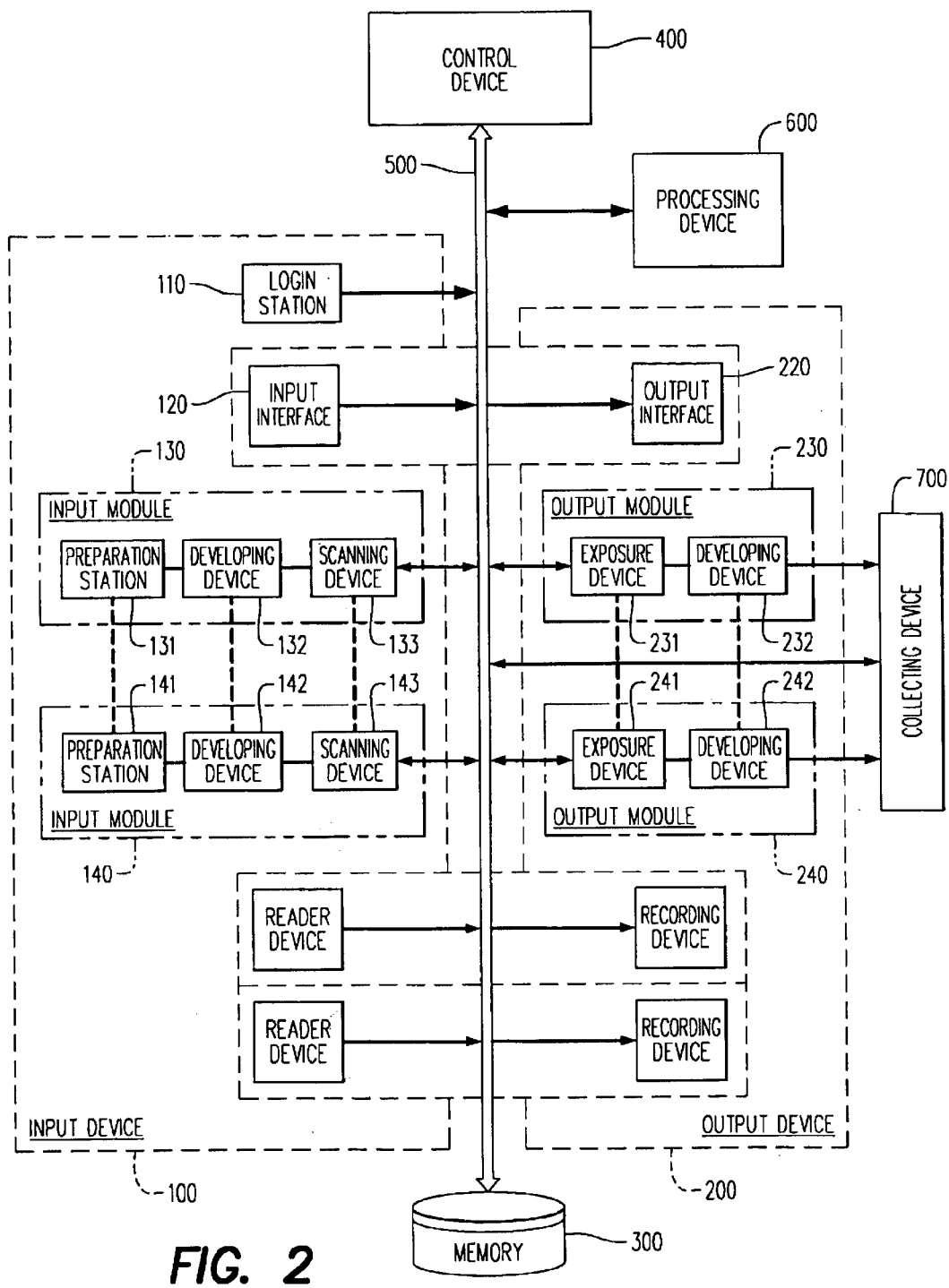
FIG. 2 a somewhat more detailed principal schematic diagram of a preferred embodiment.
Figure 5:
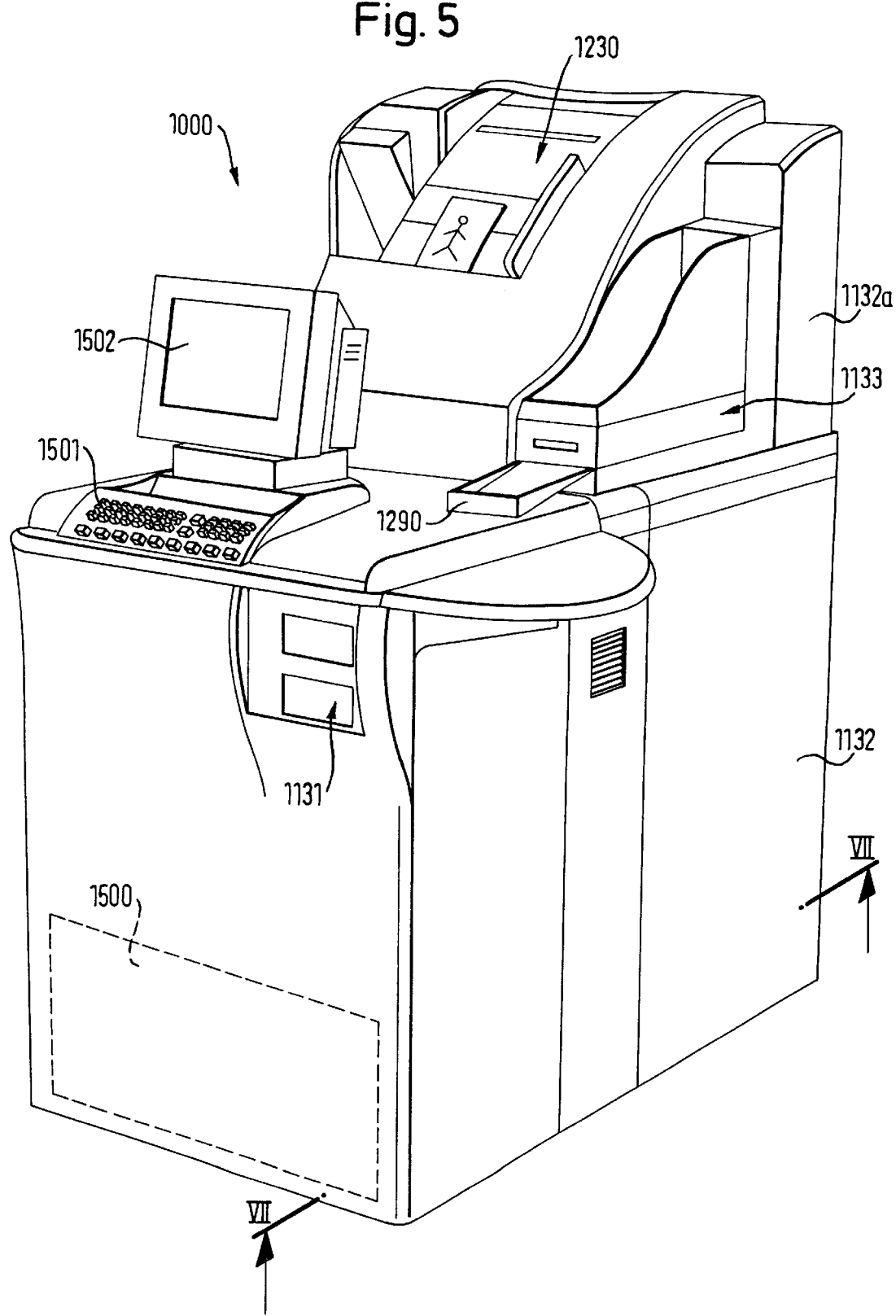
FIG. 5 a total view of a further practical embodiment in the form of a mini-lab.

A preferred embodiment of the photo print manufacturing system is illustrated in more detail in FIG. 2. One recognizes again the input device 100, the output device 200, the memory 300, the control device 400 and the data and control bus 500. In addition, a digital image data processing device 600 and a collecting device 700 are connected to the bus 500. The processing device 600 and the collecting device 700 cooperate with the control device 400 and are controlled thereby. The image data processing device 600 is preferably implemented by a corresponding program portion of the above-mentioned processor.

The input device includes a login station 110, an input interface 120 to a data net, two input modules 130 and 140, a reader device 150 for a data carrier in the form of a diskette and a reader device 160 for a data carrier in the form of a CD, especially a data CD or a photo CD.

The output device includes an output interface 220 to a data network, two output modules 230 and 240, a recording device 250 for a data carrier in the form of a diskette and a recording device 260 for a data carrier in the form of a CD, especially a data CD or a photo CD.

The input interface 120 and the output interface 220 to a data network can of course be combined into a bidirectional interface. Likewise, the reader devices 150, 160 can be combined with the respective recording devices 250, 260 into a corresponding bidirectional device. The separate illustration thereof in the drawing is only for ease of understanding.

The input modules 130 and 140 respectively include a preparation station 131 or 141 for undeveloped photographic films, from which prints are to be made, a developing device 132 or 142 for the films, and a scanner device 133 or 143 for the picture-by-picture photoelectric in line scanning of the developed films and for the production of image data representative of the originals (individual pictures) in the films. The scanning devices 133 or 143 can be a scanner commonly used in digital photographic printers for example.

In the basically conventional preparation station 131 or 141, exposed photographic films are removed from their cartridges and connected to a so-called leader card either individually or after splicing together in the form of long strips, and fed to the subsequent developing device 132 or 142. The preparation station can further include an input console for the entry of order specific accompanying data (order number, number of the image fields to be copied, number and format of the copies to be produced, desired output medium, corrections, etc.) into the system. Alternatively, if the preparation station includes no input console, the image data can also be entered into the system by way of the login station 110. After each picture has been photoelectrically scanned by the scanning device 133 or 143, the fully developed films are fed in a known manner to the further processing (combination with the copies thereof) either individually or wound up in a roll.

The scanning devices 133 and 143 produce from each scanned picture a set of raw image data (typically per scanned picture point either the colour coordinates of a colour system or a more or less large number of spectral density values). These raw image data are fed to the image data processing device 600 and processed thereby for the output thereof to digital exposure devices 231 and 241, whereby eventually necessary exposure corrections are simultaneously detected and considered. The data so processed are then temporarily stored as image data in the memory 300 together with the associated accompanying data. The processing is carried out in a known manner under control of a suitable colour management system, for example, the Gretag-Macbeth Color Management System of the Gretag Imaging AG, Regensdorf, Switzerland. The image data processing device 600 is a known image processor as used, for example, in conventional digital printers and, therefore, does not need further explanation.

The output modules 230 and 240 each include a digital exposure device 231 or 241 for the picture-by-picture in line projection of the image data temporarily stored in the memory 300 onto a photographic print material, and a developing device 231 or 241 for the exposed photographic print material. Digital exposure devices 231 or 241 can be, for example, the digital laser or CRT exposure devices commonly used in digital photographic printers. A developing device 232 or 242 can be adapted in a known manner for the handling of sheet material or strip material.

The fully developed photographic print material is fed from the developing device 232 or 242 to a collecting device 700 where it is sorted in a known manner by order, normally after a cutting operation, and possibly combined and packaged together with the associated input medium, typically the corresponding films and order bags, etc. The sorting of the finished copies and their combination with the associated input medium, is carried out in accordance with the accompanying data associated with the image data and temporarily stored in the memory 300, controlled by the control device 400.

An especially practical and advantageous embodiment of the input module and the output module is found in FIGS. 3 and 4.

As will be apparent, the scanning device 133 is combined with the film-developing device 132 into a physical unit or is integrated into the developing device. The scanning device 133 is thereby positioned at the output of the developing device 132 so that it can scan the fully developed and dried films in line. The scanning device 133 and the developing device 132 are, as mentioned above, of conventional design and do not need to be further described.

Correspondingly, the digital exposure device 231 is combined with the paper developing device 232 into a physical unit or integrated into the developing device. The digital exposure device 231 is thereby positioned at the input of the developing device 232 so that it can project individual images onto the still undeveloped printing material. An input buffer 232A is positioned before the wet chemical portion of the developing device which buffer includes the digital exposure device and feeds the photographic print materials stored in a paper cassette 232B to the wet chemical part of the developing device. The digital exposure device and the developing device 232 are otherwise of conventional construction and do not need to be described in further detail. Rather than from a paper cassette, the unexposed photographic print material can also be directly fed to the developing device from a dark room wherein larger rolls of print material are stored.

In the illustrated embodiment, the input device is provided with two input modules 130 and 140. Of course, only a single input module can be provided as well as several input modules. It is especially preferred to provide two or more input modules of different construction. For example, the different input modules can be adapted for different film types (for example, 135, APS, etc.). The input modules can also be physically combined. Furthermore, for the processing of repeat orders, at least one input module can be adapted for the processing of already developed photographic films, whereby no film-developing device is then necessary.

Analogously, the output device can also include either only a single output module or two or more output modules. It is especially preferred to provide two or more output modules of different construction. The different output modules can be adapted to handle different print material (different widths, different surface qualities). The output modules can also be physically combined and provided, for example, with a common, multi-track paper developing arrangement.

The image data of prints to be produced and the associated accompanying data can be input to the system in other ways. For example, these data can be stored on a digital data carrier in the form of a diskette or a data or photo CD and input by way of the corresponding reader devices 150 or 160 and then stored in the memory 300. Furthermore, the system can be connected with a data network by way of the input interface 120 on which network the image data to be processed and the associated accompanying data are made available and can be read into the system. The processing of the entered image data in the image data processing device 600 takes place only when the image data are not already in processed form, whereby the differentiation can be made, for example, by way of the accompanying data.

Conversely, the temporarily stored image data can also be output to an output medium other than photographic print material. The image data can, if desired, be stored together with the associated accompanying data on a digital data carrier in the form of a diskette or a data or photo CD by way of the recording devices 250 and 260, or fed into a data network by way of the output interface 220. The image data so stored on the data carrier or fed into the data network can, if desired after external processing, be re-input to the photo manufacturing system at a later point in time and, for example, output on another output medium, for example, photographic print material.

The control device 400 controls the flow of data for each order according to the accompanying data associated with the image data. It receives the image data and the associated accompanying data from the different components of the input device 100, stores them order dependent in the memory 300 and transmits them also order dependent and according to the accompanying data associated with the image data to the different components of the output device 200.

The collecting device 700 in cooperation with the control device 400 respectively coordinates the input media with the corresponding output media according to the accompanying data associated with the image data. In the case of a photographic film as input medium, it can be coordinated with the corresponding copies produced or with the produced diskette or CD as output medium. In the case where a diskette or CD is the input medium, the copies produced or another diskette or CD are coordinated therewith as output media, etc. The collecting device 700 essentially corresponds to a conventional sorting and packing device commonly used in conventional photo-finishing lines and, therefore, does not require any further description.

It is understood that in other preferred embodiments, the input device 100 and output device 200 can respectively include only a part of or several of the components illustrated, for example, in FIG. 2.

A concrete exemplary embodiment of the photo print manufacturing system in accordance with the invention in the form of a mini lab is shown in more detail in FIGS. 5 to 15.

With respect to its outer appearance, the illustrated mini lab resembles by and large conventional mini labs, for example, the mini labs "Masterflex™" or "Masterlab™" of the Gretag Imaging AG, Regensdorf, Switzerland. The mini lab generally referred to by reference numeral 1000 houses in or on its compact housing all functional components which are necessary for the manufacture of physical copies of originals which are contained as latent images in individual, undeveloped photographic films. In detail, those are in and of itself, a conventional loading station 1131 for individual, undeveloped photographic films, a developing and drying arrangement 1132/1132A for the individual films, a scanning device (scanner) 1133 for the developed and dried films, an electronic controller 1500, and a digital output module 1230 which preferably is a colour printer (for example, an ink jet printer) or alternatively conventionally a digital exposure device for photographic print material (copier paper) stored in the mini-lab, as well as a developing arrangement for the exposed print material. The loading station 1131, the developing and drying devices 1132/1132A, the scanning device 1133 and the output module 1230 functionally correspond to the components 131, 132, 133 and 230 already described above in more detail in connection with FIG. 2. The electronic control 1500 includes or implements the image data memory 300, the control device 400, the data and control bus 500 and a digital image data processing device 600 or the functions of those components (not illustrated in this FIG.) and cooperates with a keyboard 1501 and a monitor 1502 as user interface.

The scanning device 1133 is, as described below in more detail, constructed in such a way that it can not only scan the films fed from the developing and drying device 1132/1132A, but that developed films can also be directly (manually) input thereto. The mini lab can thereby also be used to carry out repeat orders.

Figure 6:
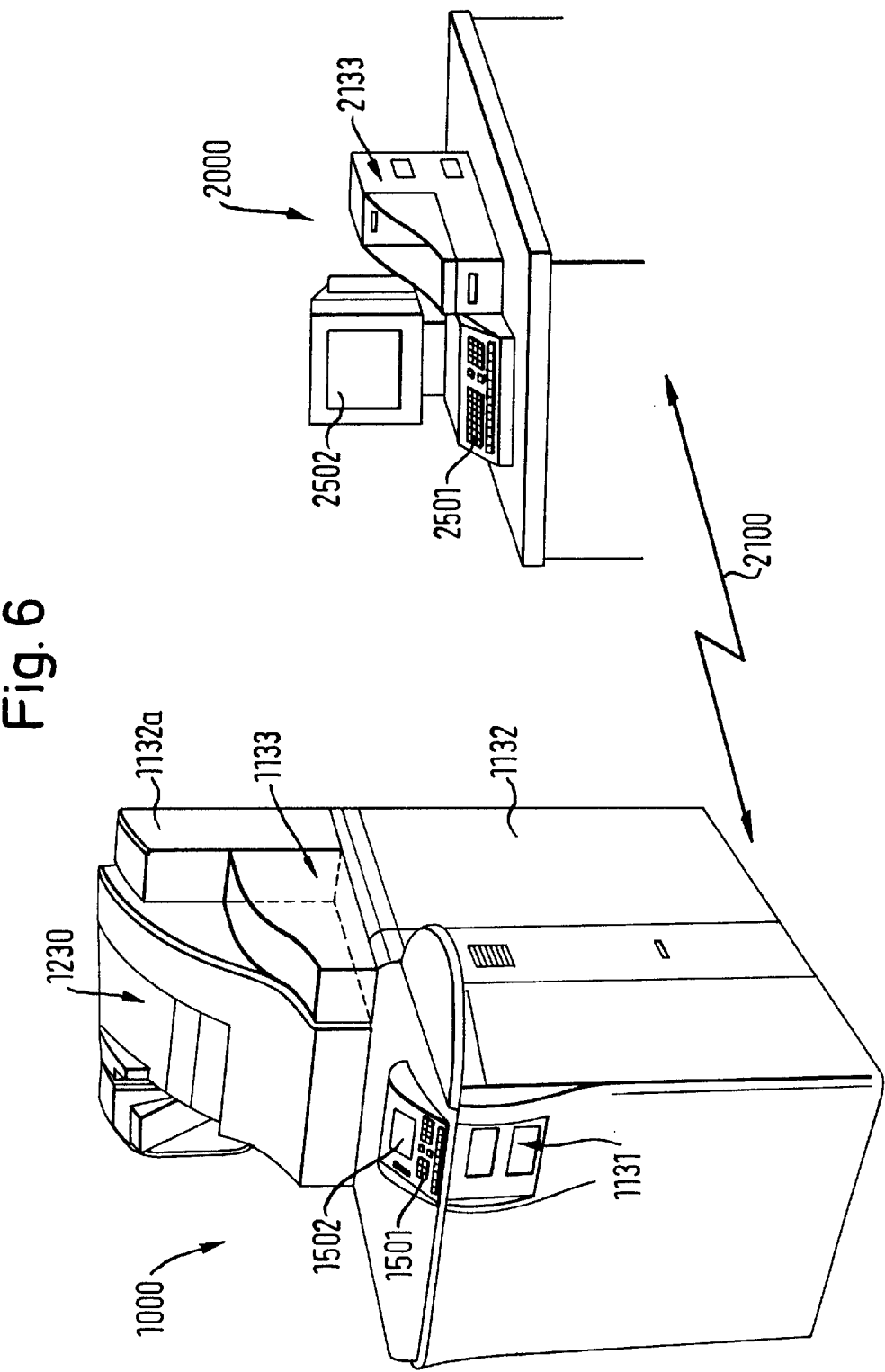
FIG. 6 an overall view of a variant of the mini-lab according to FIG. 5.

According to the variant shown in FIG. 6, the mini lab can also be provided with a physically separate work station 2000 which is essentially a scanning device 2133 for developed photographic films as well as an electronic control 2500 cooperating therewith, which is equipped with a keyboard 2501 and a monitor 2502 as user interface. The scanning device 2133 is preferably constructed the same as the one of mini lab 1000. The work station 2000 is connected data-side and control-side by a communications channel (cable, network, data carrier, etc.) symbolized by arrow 2100, whereby the raw or processed image data produced in the work station can be transferred to the mini lab. The work station 2000 corresponds in its functions also essentially to one of the input modules illustrated in FIG. 2 (without developing arrangement). Of course, several work stations 2000 can cooperate with the mini lab 1000. Conversely, several mini labs 1000 can also be served by one or more work stations 2000, for example, when those are adapted for the output of different copy formats or to optimize capacity. The above discussed general considerations and possibilities in this respect are correspondingly applicable also to the mini lab variant of the photo print manufacturing system in accordance with the invention.

The mini lab can further be provided with several or all input and output interfaces 120 or 220 and reader and recording devices 150, 160 or 250, 260 of the embodiment according to FIG. 2. In this respect, the explanations given in respect to the latter are also completely applicable for the construction variant of the invention as a mini lab. Finally, the processing of the raw image data into a form suited for output and/or the deliberate alteration of the image content (actual image processing) can take place already in the work station 2000, which means the control 2500 of the work station 2000 can include an image data processing device analogous to the one of mini lab 1000 or implement the functions thereof.

The construction and function of the scanning device 1133 of the mini lab 1000 will be further described in the following.

Figure 7:
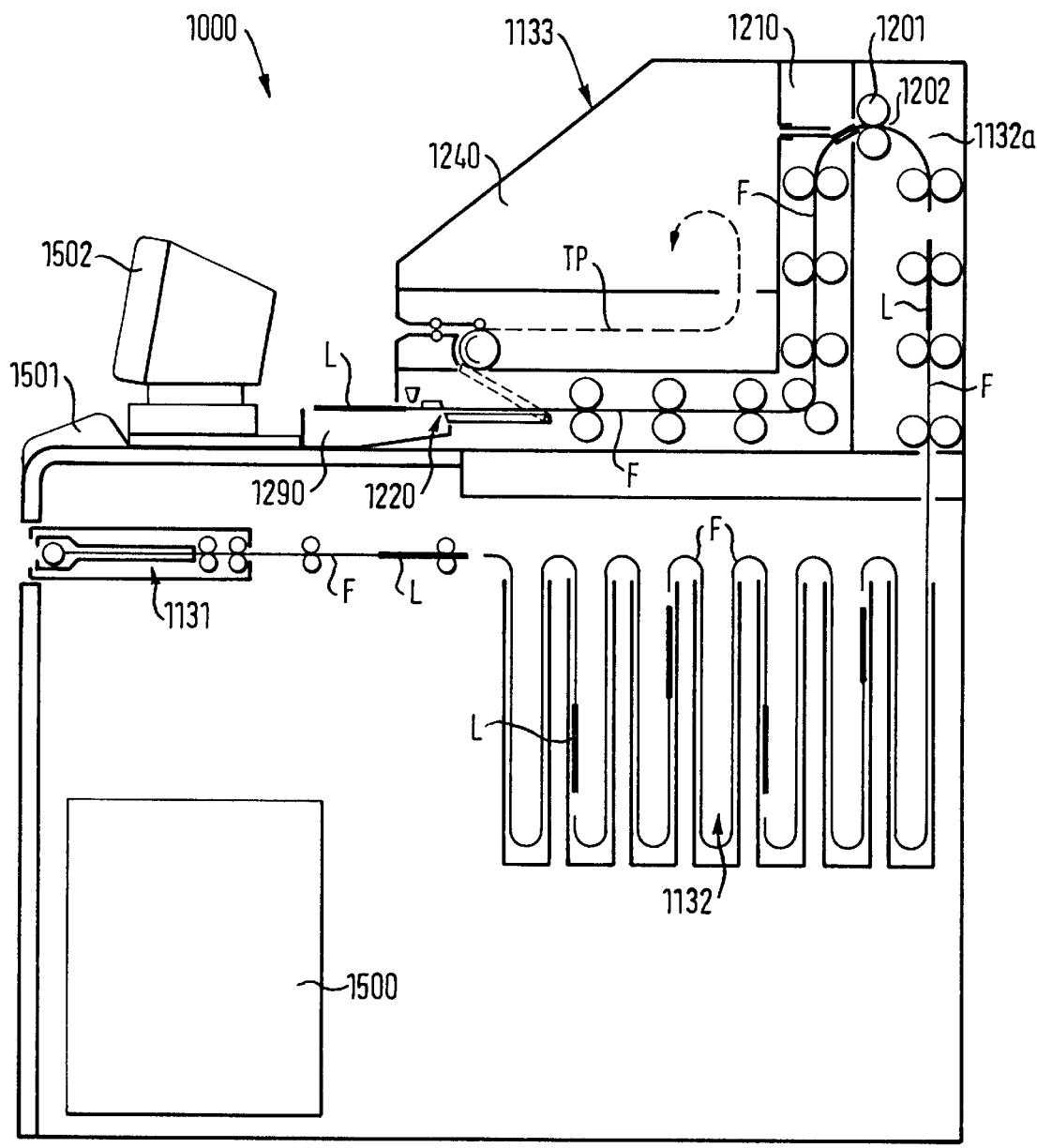
FIG. 7 a schematic cross section along line 7—7 in FIG. 5.

As is apparent from FIG. 7, an exposed film F placed into the loading station 1131 of the mini lab 1000, which film normally is included in a cartridge and has been previously provided in a separate station with a leader card L, is automatically removed in conventional manner from the cartridge and transported through the developing and drying arrangement 1132/1132A while attached to the leader card. The developed and dried film F then leaves the developing and drying arrangement 1132/1132A with the leader card L in the lead and through an exit gap 1202 formed by a pair of transfer rollers 1201. From there, the developed film F together with the leader card L is guided through a guide channel 1201, which is positioned behind and under the scanning device, to a cutting station 1220 wherein the leader card L is severed and guided to a storage container 1290. The film F so severed from the leader card L is then guided to the scanning device 1133 and photoelectrically scanned therein at high resolution and finally enters (FIG. 10) into a film-collecting container 1240 provided at the scanning device.

Figure 8:
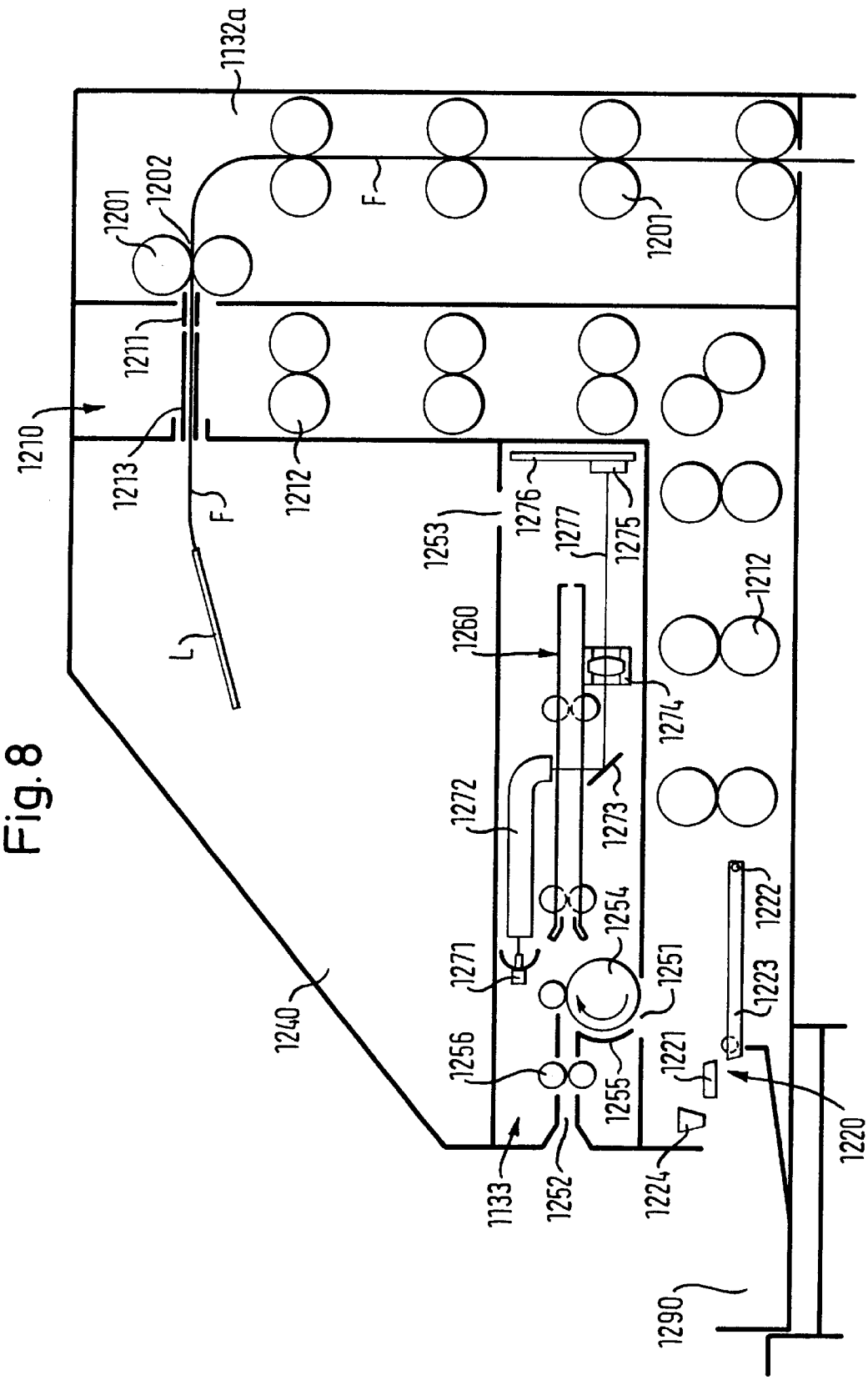
FIGS. 8 to 11 the upper portion of FIG. 7 in more detail and different functional phases.
Figure 9:
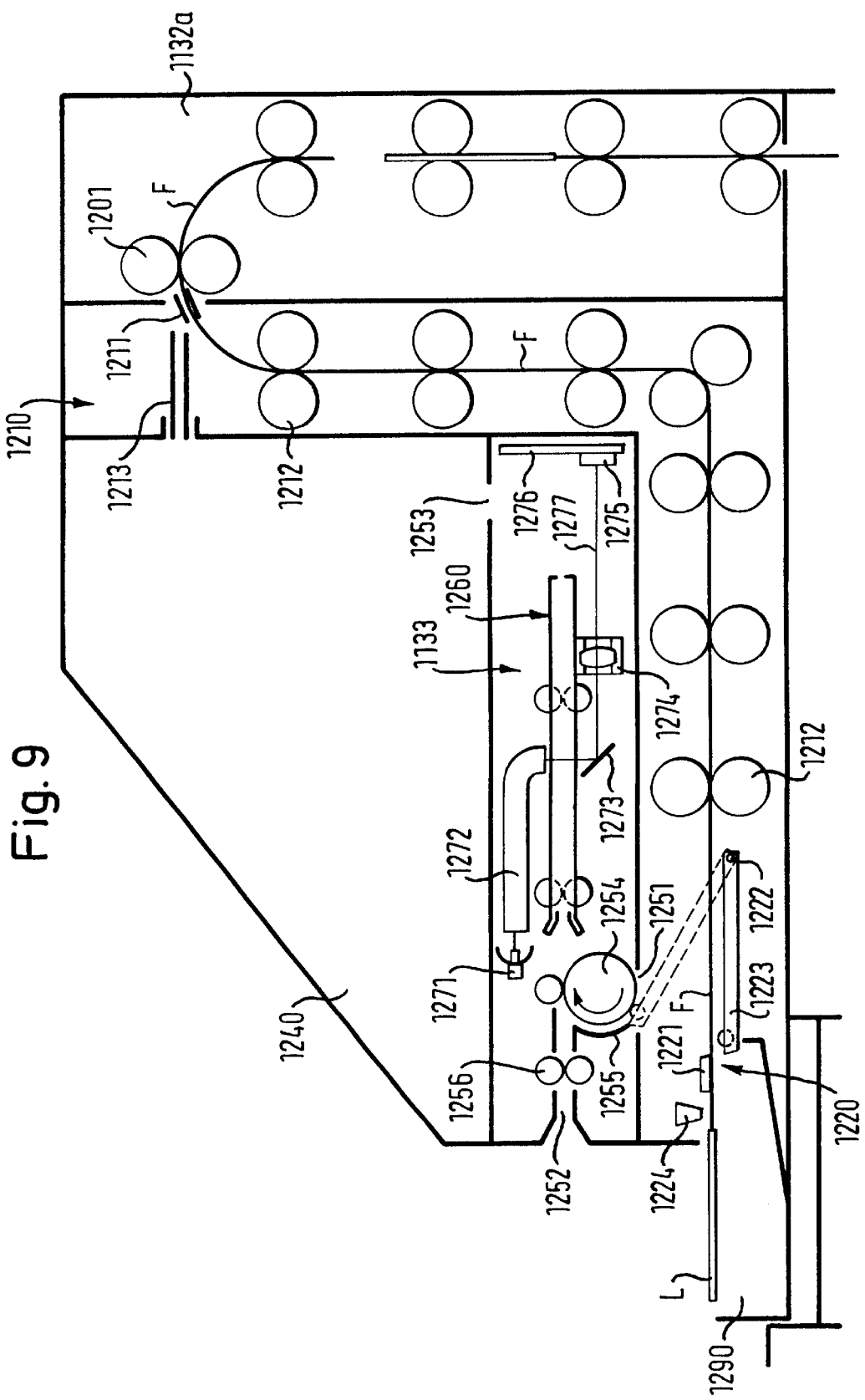
Figure 10:
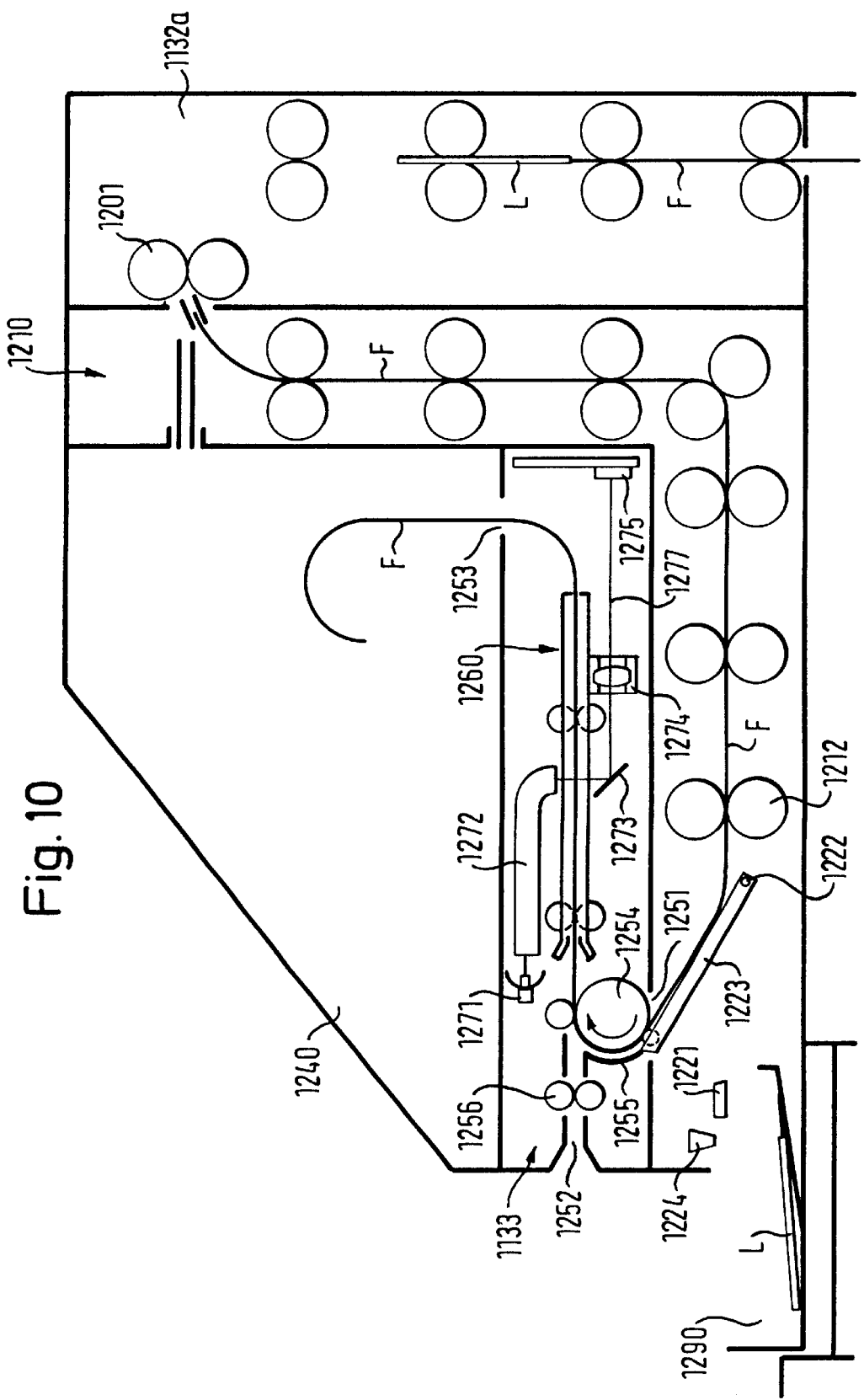
Figure 11:
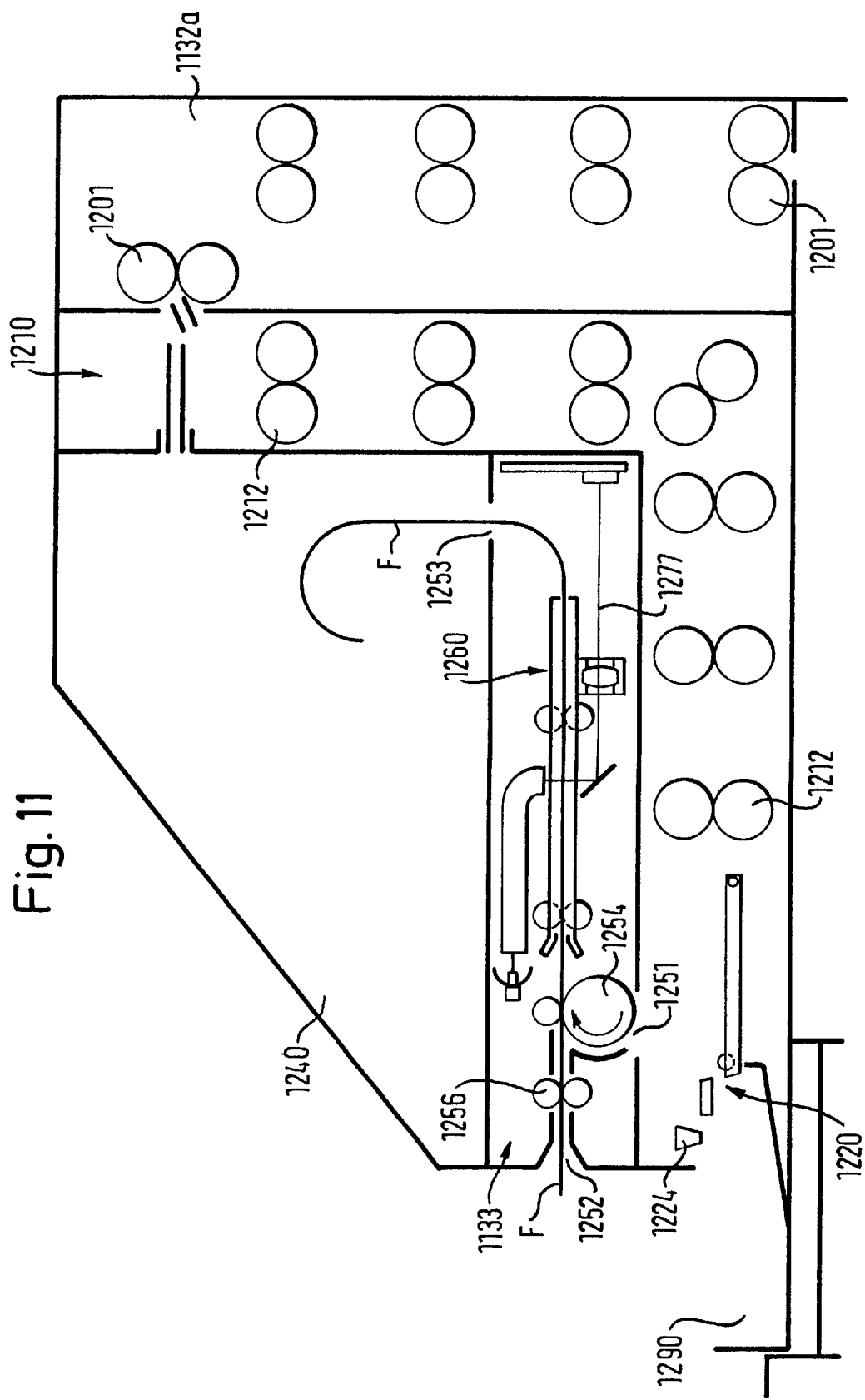
Figure 12:
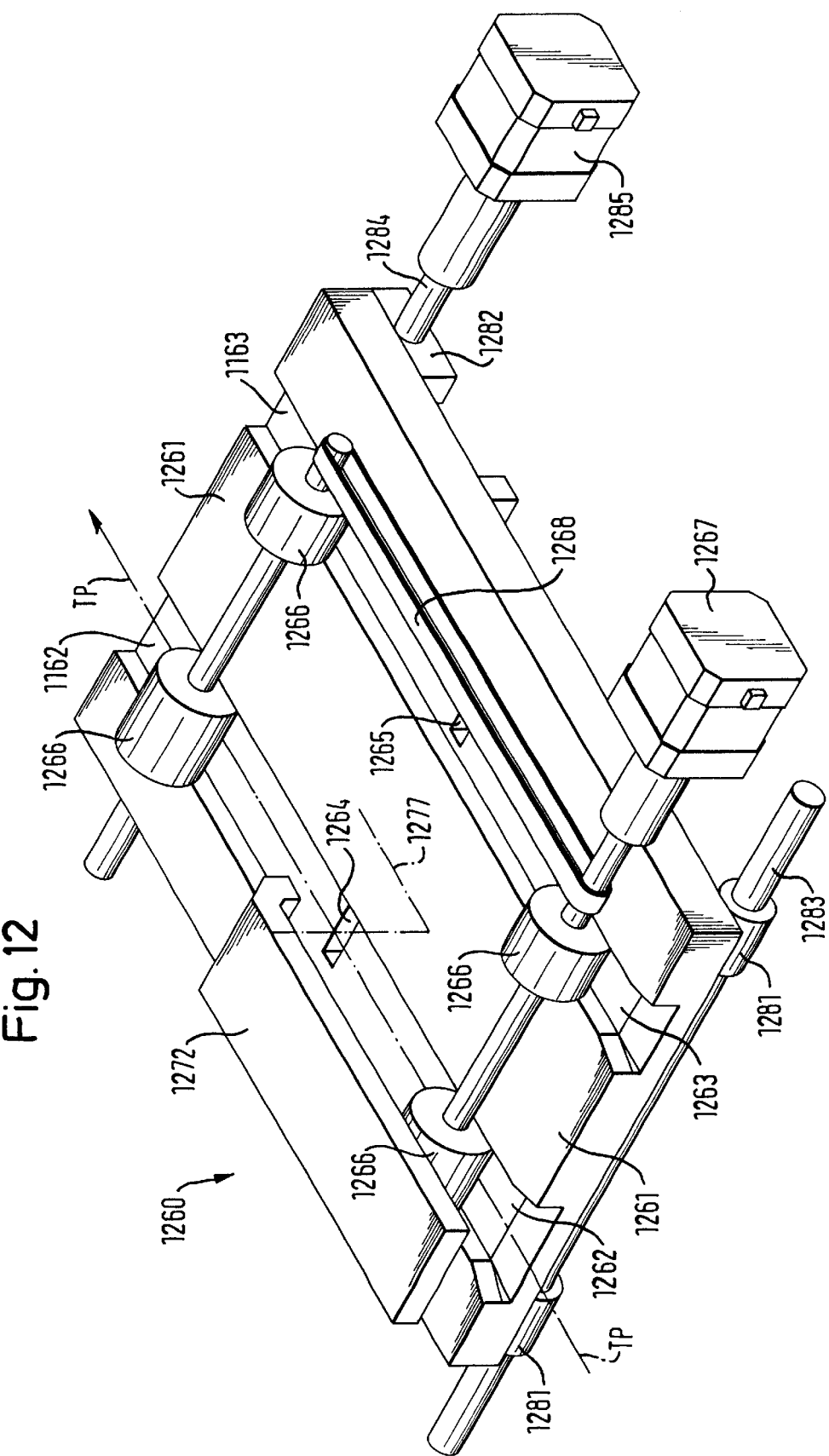
FIG. 12 an overall view of an exemplary embodiment of a film platform used in the scanner of the mini lab of FIGS. 5 through 11.
Figure 13:
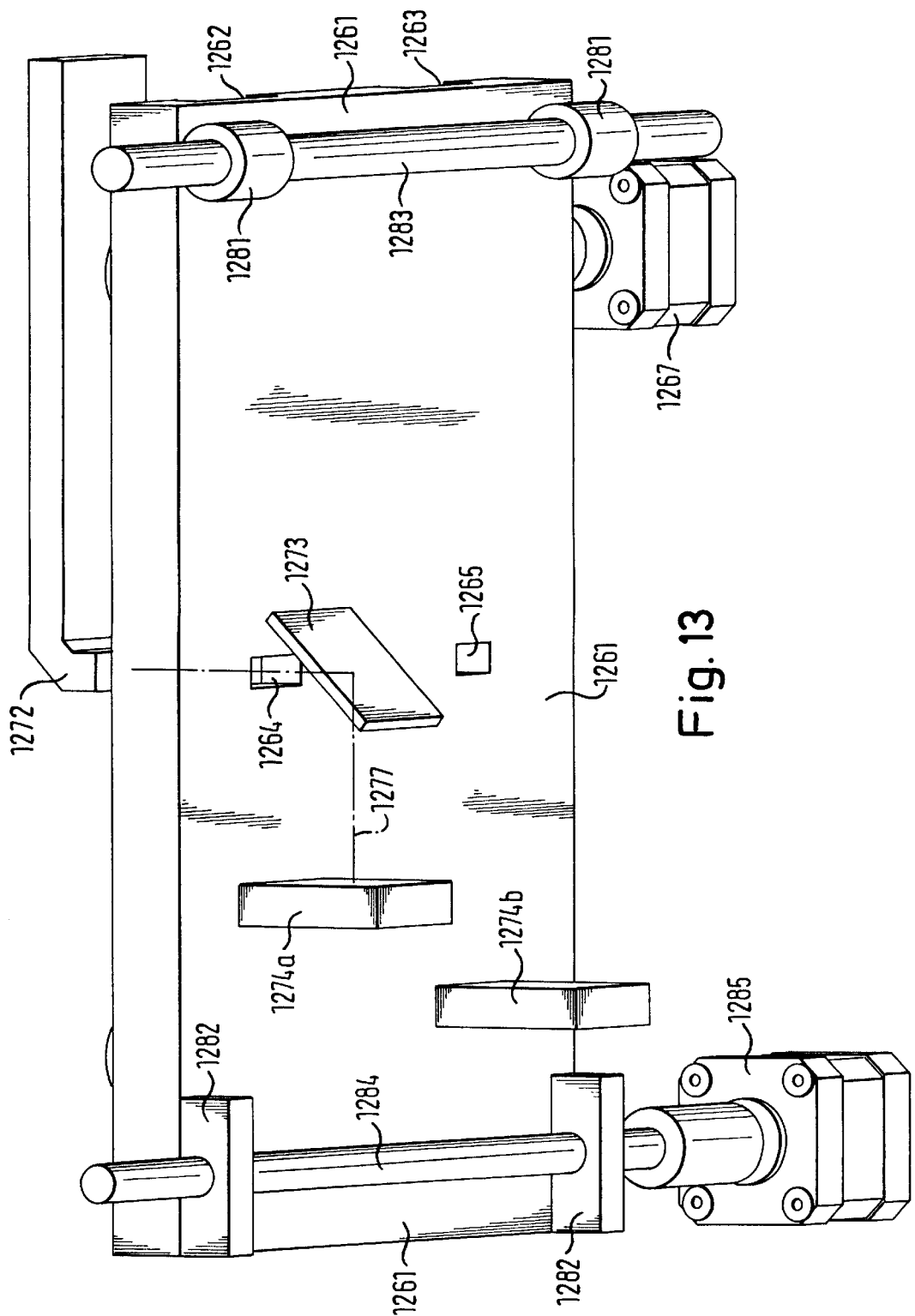
FIGS. 13 to 15 the film platform of FIG. 12 from below, from the side and from the front.
Figure 14:
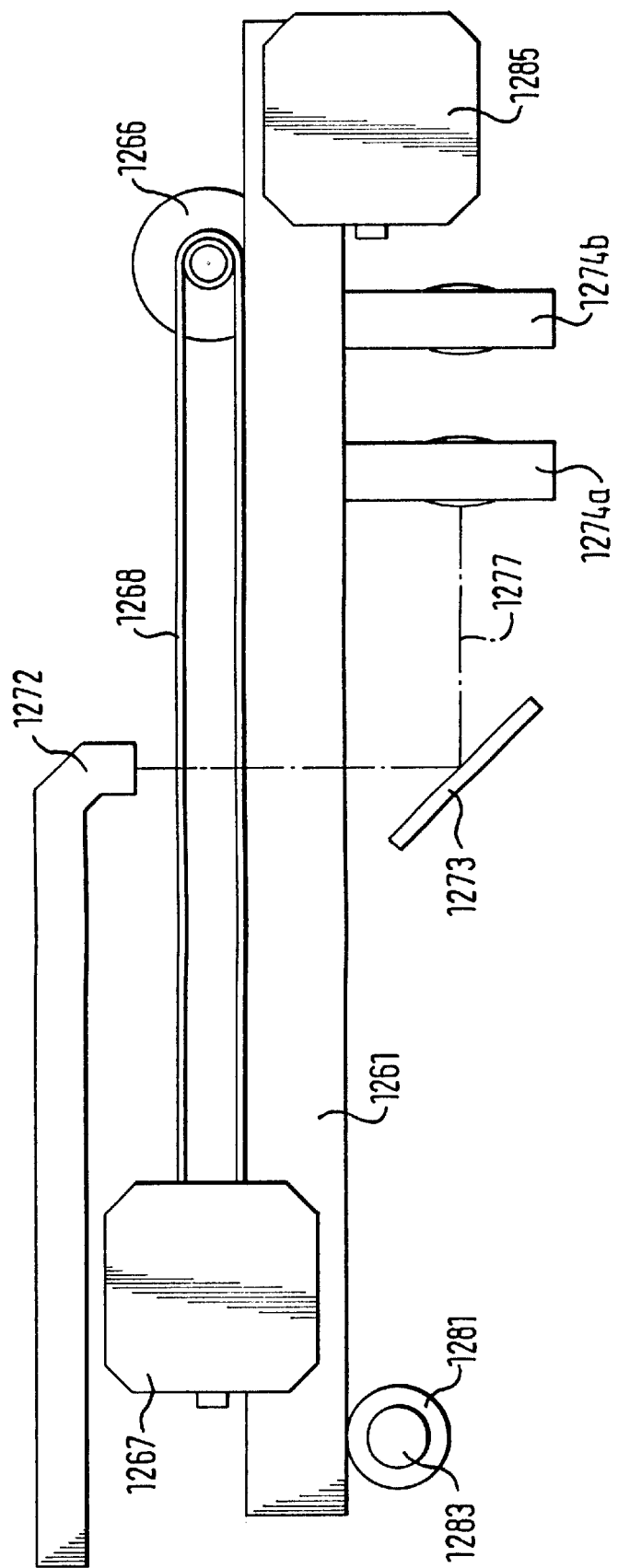
Figure 15:
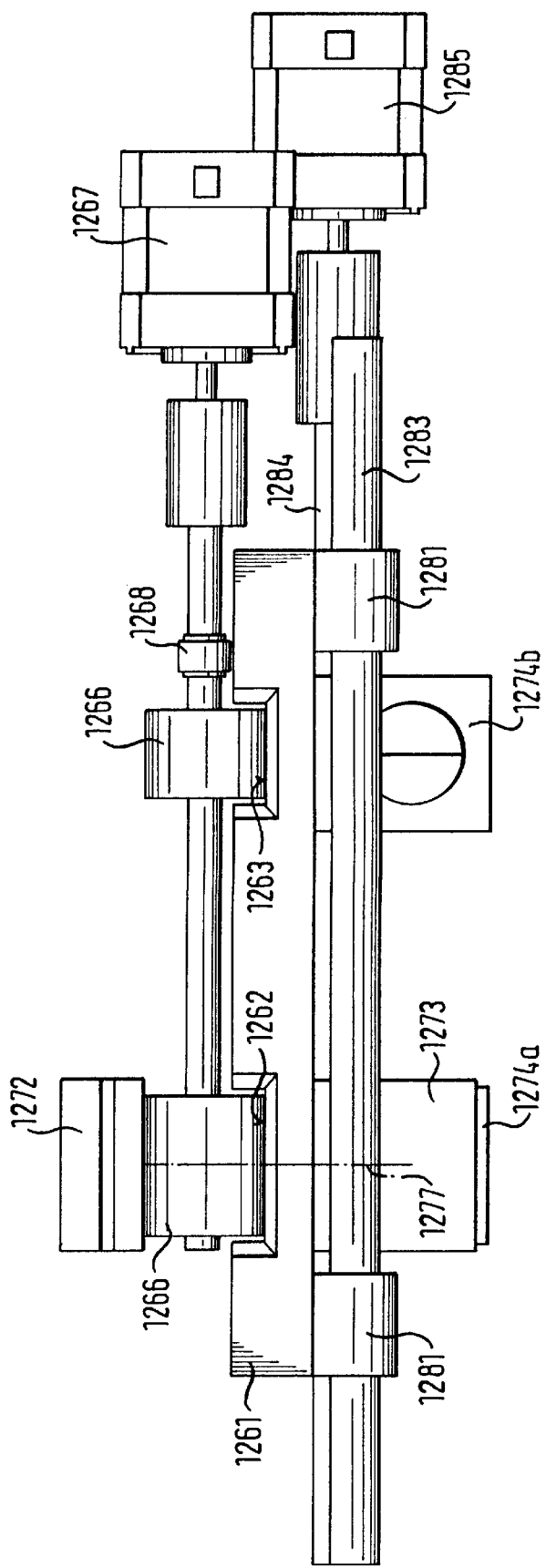

A first film switch 1211 is provided at the exit gap 1202 of the drying arrangement 1132A by which the exiting film is selectively guided either to a first row of transport roller pairs 1212 positioned in the guide channel 1210, or to a guide bridge 1213 which guides the leader card L, with the film F attached thereto, directly into the film-collecting container 1240. The latter takes place, for example, when the film is to be developed only but not scanned (FIG. 8). Normally, the film F is however guided through the guide channel 1210 to the cutting station 1220 and from there further into the scanning device 1133 (FIGS. 9 and 10).

The scanning device 1133 includes two inlets 1251 and 1252 and one outlet 1253 which leads into the film-collecting container 1240 (outlet-side guide means for the film are not illustrated for reason of clarity). The film F which has been severed in the cutting station 1220 from the leader card L is guided into the scanning device through the lower inlet 1251 illustrated in the drawing and then redirected into a horizontal transport web (FIG. 10) by way of a transport roller pair 1254 and a guide sheet 1255. A developed film strip (without leader card) can be directly manually fed (FIG. 11) into the forward inlet 1252 of the scanning device 1133 with the help of a further transport roller pair 1256. The latter is necessary, for example, for repeat orders.

The cutting station 1220 includes a stationary knife bar 1221 and a knife 1223 which is rotatable about an axis 1222, which knife normally is in the position illustrated in FIG. 8. When a leader card L with the film F attached thereto arrives through the guide channel 1210, it is further transported under the stationary knife bar 1221, through a photo detector 1224 and into the storage container 1290 (FIG. 9). Under control of the photo detector 1224, the rotatable knife 1223 is then moved upward into the position illustrated in FIG. 10, whereby the film F is severed from the leader card L. The film F is then transported into the scanning device 1133 through the lower entry 1251 until it is finally grabbed by the transport roller pair 1254 and further transported thereby. The rotatable knife 1223 ha s a dual function: on the one hand, it severs the leader card from the film F and, on the other hand, it functions as a redirecting switch for the film.

Apart from the mentioned components, the scanning device 1133 according to a further important aspect of the invention includes an especially constructed film platform 1260 for the guidance and transport of the film F as well as the actual photoelectrical scanning arrangement, which allows the dotwise measurement (scanning) of the film with high resolution relative to its optical transmission characteristics. The actual scanning arrangement (FIG. 8) includes a light source 1271, a light conductor 1272 in the form of a flat bundle of light conducting fibres, a redirecting mirror 1273, image optics 1274, a sensor 1275 in the form of a row of CCD or photo diodes and associated electronics 1276 which control the sensor 1275 and bring the signals generated thereby into a form processable by a computer. The light source 1271, the light conductor 1272, the redirecting mirror 1273, the sensor 1275 and the electronics 1276 are stationary in the scanning device 1133, the image optics 1274 are on the film platform 1260, which, as discussed further below, is movably mounted in the scanning device.

Apart from the special arrangement of its individual parts, the scanning arrangement 1270 is conceptionally and functionally essentially conventional. Through the light source 1271 and the light conductor 1272, the film F on the film platform 1260 is illuminated line by line along a small scanning strip extending transverse to the film transport direction. This strip is projected from the opposite side of the film through a window in the film platform and by the redirecting mirror 1273 and the image optics 1274 onto the line-shaped sensor 1275 which converts the received light into corresponding electrical signals. The path of the scanning rays is identified in FIG. 8 as 1277. The local resolution of the scanning in direction of the scanning strip (transverse to the film transport direction) is determined by the size and spacing of the individual light sensitive elements of the sensor 1275 and in transport direction by the width of the scanning strip as well as the transport speed of the film. Colour separation can be achieved by use of a correspondingly colour selective sensor (for example, a colour television camera) or by using appropriate colour filters. If desired, a spectral scanning can take place, whereby only a dispersive element needs to be positioned in the path of the scanning rays and a sensor, for example, in the form of a two-dimensional field of light-sensitive elements. Scanning arrangements suited for the photoelectric measurement of films are known per se in numerous variants and, thus, do not need to be further described.

In order to avoid positioning faults during the high resolution photoelectric scanning of the film F, the film must be guided very exactly at least in the region of the scanning location. This is only possible when the guide structures intended therefor are exactly adapted to the dimensions (width) of the film. Upon a change of the film format, the guide structures must therefor also be correspondingly adapted which means nothing else but that a separate scanning device is provided for each film format or the scanning device 1133 must be replaced with each change of the film format. However, since one must expect the film format to change repeatedly during practical application, this would be very cumbersome. According to a further important aspect of the invention, the film platform 1260 of the scanning device 1133 is therefore constructed as a moveable platform for two or more film formats. The moveable platform is thereby provided with two or more arrangements of guide structures, one for each film format, and these arrangements of guide structures are depending on the film format selectively switched into the transporting path of the film so that each film is always exactly guided by the correct guide structures adapted to its format and positioning faults during scanning are avoided. The interchangeable selection of the individual arrangements of guide structures is thereby carried out fully automatically in that the film width is determined at a suitable location in the transport path of the film, for example, by way of an arrangement of photo detectors or other detectors, and the moveable platform is appropriately adjusted by motors. Of course, an adjustment by hand is also possible. Alternatively, several film platforms can be provided which are selectively moved into the transport path.

FIGS. 12 to 15 show the detailed construction of the film platform 1220, in this embodiment, a moveable carrier for two film formats (for example, 135 and APS).

The film platform 1260 includes a base plate 1261 into which upwardly open guide channels 1262 and 1263 of different width are inset. The widths of the guide channels are exactly adapted, for example, to films of the 135 format and the APS format. A small scanning window 1264 or 1265 is respectively provided at about the center of the two guide channels and in the base plate 1261 through which the films are scanned. Four drive rollers 1266 which are pairwise mounted on common shafts, are rotatably mounted on the base plate 1261 and driven by a common motor 1257 directly or by way of a tooth and belt 1268. Two drive rollers 1266 respectively dive into the guide channels 1262 and 1263 and serve for the transport of the film F guided in the respective channel. The base plate 1261 is on one sided provided with two glide bearings 1281 and on the other side with two spindle bearings 1282. The glide bearings 1281 glide on a glide rod 1283 which extends transverse to the film transport direction and is stationary mounted in the scanning device 1133. The spindle bearings 1282 receive a rotatable spindle 1284 which is parallel to the guide rod 1283 and is driven by an also stationary spindle motor 1285. By way of the spindle motor 1285, the base plate 1261 can be adjusted transverse to the transport direction of the film in such a way that respectively one or the other of the two guide channels 1262 or 1263 are selectively brought into the transport path of the film defined by the guide and transport structures which are stationary in the scanning device. The transport path of the film is identified in FIG. 12 by a broken line whereby here the guide channel 1262 is positioned in the transport path.

The light conductor 1272 which is optically connected with the light source 1271 is stationary and positioned such that its light exit end is symmetrically positioned above the transport path TP and aligned with the scanning window 1264 (or 1265) of the guide channel 1262 (or 1263) in the transport path TP. The redirecting mirror 1273 is positioned stationary below the scanning window exactly under the light exit end of the light conductor 1272. The image optics of the scanning arrangement are mounted on the underside of the base plate 1261, whereby separate image optics 1274A or 1274B are provided for each of the two guide channels 1262 and 1263. Thus, depending on the position of the base plate 1261, only either the image optic 1274A or the image optic 1274B are used. The image optics 1274A and 1274B are thereby so adjusted that they produce a sharp image of the illuminated strip of the film lying thereabove on the common, also stationary sensor 1275 by way of the stationary common redirecting mirror 1273.

Figure 16:
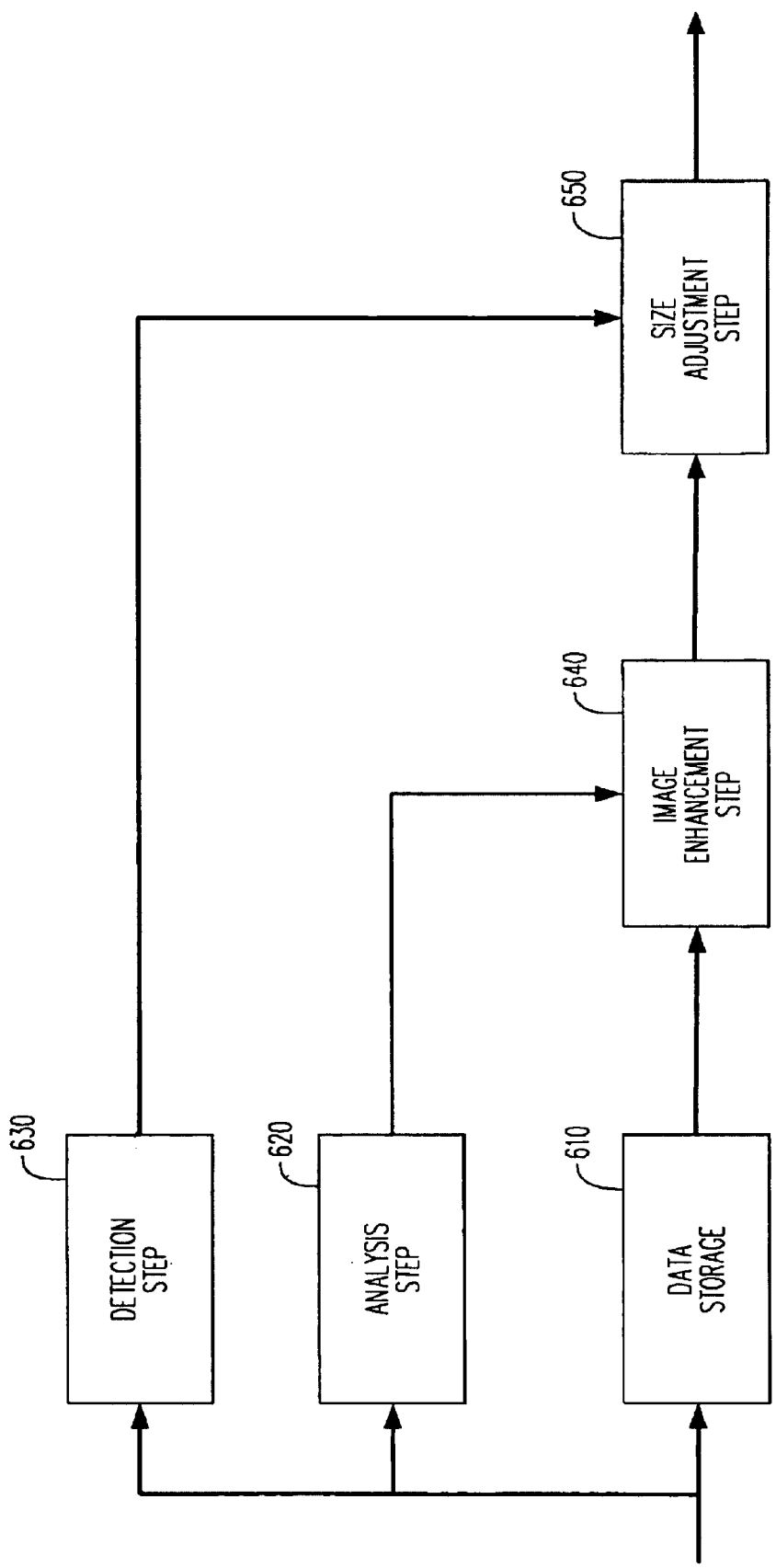
FIG. 16 a block diagram illustrating an exemplary manipulation or processing of captured digital image data.

It will be described in more detail in the following with reference to FIG. 16 how the raw image data generated by the scanner can be further processed by the processing device 600 with respect to the output to a desired output medium (for example by way of a colour printer or a digital projecting device).

The raw image data of the individual pictures of a film strip generated by the scanning device or otherwise input are temporarily stored in a memory step 610 and simultaneously subjected to different analyses in an analysis step 620as well as a detection step 630. The mentioned steps and the further steps mentioned in the following are thereby understood as processing steps which are implemented by corresponding program portions of the processing device 600 and a data storage. The raw image data of several or all pictures of the film strip are analyzed in the analysis step 620 for the characteristics of the film material used and the characteristics of the image content, and the parameters for the image enhancement are determined on the basis of these characteristics. This includes parameters for the colour and density control, the focus enhancement and the contrast control. This analysis is carried out according to generally known methods as described in detail, for example, in U.S. Pat. Nos. 5,119,125 and 5,365,353. The disclosure of these printed publications is hereby expressly incorporated into the present disclosure. In the detection step 630, the length and width of the individual pictures on the film are calculated from the raw image data and the image resolution parameters are formed. This is possible, for example, by way of generally known edge detection processes.

When the calculations carried out in the steps 620 and 630 are completed, the image data temporarily stored in the data storage 610 are processed one image at a time in an image enhancement step 640 and together with the parameters calculated in the analysis step 620, in order to achieve the corrections required for the colour, density, focus and contrast control. This processing is also again carried out according to the known methods described in the publications U.S. Pat. Nos. 5,119,125 and 5,365,353. The image data so corrected are finally processed one image at a time in a size adjustment step 650 together with the image resolution data determined in the detection step 630, whereby the three dimensional resolution of the data is newly calculated so that the images can be output in the desired size onto the output medium. The fully processed image data are then either stored or transferred one image at a time to the desired output device, especially a colour printer or a digital exposure device.

The print manufacturing system described is very flexible in terms of application because of its capability to receive image data and accompanying data from different input media and to output them to different output media. By employing differently built input and output modules, a time consuming presorting according to different film types and copy formats and qualities is obviated. The spacial and temporal decoupling of image data detection and image data output generates a large temporal and spacial flexibility and especially the image data detection and image data output can be carried out at different speeds which are optimally adjusted to the respective process. Costly and space sensitive mechanical temporary storage for film and copier paper is avoided because of storage of the pictures as digital image data. Integration of the scanning device into the input modules and of the digital exposure device into the output modules obviates a printer in the classical sense.

Furthermore, the photo print manufacturing system in accordance with the invention has the further advantage that an eventually required or desired image processing is very easily realized. For example, so called index prints can be produced from the stored image data, whereby the superposition of suitable image masks is very easily achieved. Further, greeting cards and the like can be produced, for example, i.e. combinations of the actual image content with fixed or variable sample image contents or text. Enlargements of sections, possibly also rotated, can also be easily realized by way of the digital image processing. Finally, through proper processing of the corresponding image data, the images can be wilfully modified (image enhancement), for example, the known correction of red eyes in pictures of humans faces.

What is claimed is:

1. Digital image processing system for outputting image data via output components, the system comprising:

an input device for the registration of digital image data from an input media and for the registration of order-specific accompanying data associated with the image data;

a data storage for temporary storage of the registered image data and the order-specific accompanying data;

an output device for outputting the image data; and a control device for controlling and connecting the input device, the data storage, and the output device, the control device managing and controlling the flow of data between said devices according to the order-specific accompanying data associated with the image data, wherein the output device includes at least two different output components which cooperate with the control device, the control device selectively feeding the image data temporarily stored in the data storage to different output components according to the order-specific accompanying data associated with the image data, said order-specific accompanying data specifying a desired output component for outputting the image data, and wherein the input device comprises:

at least one reader device for reading image data and associated order-specific accompanying data recorded on a digital data carrier.

2. A system according in claim 1, comprising a digital processing device for processing registered image data, wherein the digital processing device is connected to the control device and co-operates therewith such that output image data is processed image data.

3. A system according to claim 2, wherein the digital processing device which cooperates with the control device processes the registered image data in preparation for further processing in at least one digital exposure device.

4. A system according to claim 1, wherein the input device comprises:

at least one input station for the registration of the order-specific accompanying data associated with the image data.

5. A system according to claim 1, wherein the input device comprises:

at least one scanning device for the photoelectric scanning of each picture on the originals and for the generation of image data representing the originals.

6. A system according to claim 1, wherein the input device comprises:

at least one interface to an electronic data network for the input of image data and the associated order-specific accompanying data made available on the data network.

7. A system according to claim 1, wherein one of the at least two different output components of the output device comprises:

at least one colour printer or a digital exposure device for the picture-by-picture projection of the image data temporarily stored in the data storage onto a photographic printing material.

8. A system according to claim 1, wherein one of the at least two different output components of the output device comprises:

at least one recording device for the recording on a digital data carrier of image data temporarily stored in the data storage and the accompany data associated therewith.

9. A system according to claim 1, wherein one of the at least two different output components of the output device comprises:

at least one interface for outputting the image data to an electronic data network.

10. A system according to claim 1, wherein the input device comprises:

at least one input module cooperating with the control device and including a developing device for photographic films as well as a scanning device combined therewith into a physical unit for the photoelectric inline scanning of each picture of the developed films and for the generation of image data representing the originals included on the films.

11. A system according to claim 10, comprising:

a collecting device associated with and controlled by the control device for sorting the output media exposed with image data by the output device according to the order-specific accompanying data associated with the registered image data, and assigning them to the photographic films processed by at least one input module.

12. A system according to claim 10, wherein the input device comprises:

at least one input module for photographic films that have already been developed cooperating with the control device, and a scanning device for a photoelectric inline scanning of each picture of the developed films and for the generation of image data representing the originals included on the films.

13. A system according to claim 10, comprising:

a collecting device cooperating with and controlled by the control device for sorting the photographic copies generated by the output module or modules according to the order-specific accompanying data associated with the registered image data and assigning them to the associated photographic films processed by at least one input module.

14. A system according to claim 10, wherein the input device comprises:

at least two input modules cooperating with the control device processing different film types.

15. A system according to claim 1, wherein one of the at least two different output components of the output device comprises:

at least one output module co-operating with the control device and including a development device for photographic print material as well as a digital exposure device integrated therewith into a physical unit for the in line projection of each picture of the image data temporarily stored in the data storage onto undeveloped photographic printing material.

16. A system according to claim 15, wherein the output device comprises:

at least two output modules cooperating with the control device for processing different printing material, the control device selectively feeding to the output modules the image data temporarily stored in the data storage according to their degree of use or availability and according to the order-specific accompanying data associated with the image data.

17. A system according to claim 16, wherein the output modules include a common, multitrack developing device, wherein each track of the developing device is associated with a proper digital exposure device.

18. A system according to claim 1, wherein the collecting device sorts the output media exposed with the image data by the output device according to the order-specific accompanying data associated with the registered image data and assigns them to the associated digital data carriers read by the reader device.

19. A system according to claim 1, comprising:

a collecting device cooperating with and controlled by the control device, for sorting the output media exposed with image data by the output device according to the order-specific accompanying data associated with the registered image data.

20. A system according to claim 1, constructed as a mini-lab and combined into a physical unit comprising:

a film-loading station, a film-developing and drying device, a photoelectric scanning device, a digital output module, and a controller for control thereof, wherein the loading station, the developing and drying device, and the photoelectric scanning device cooperate in line.

21. A system according to claim 20, wherein the photoelectric scanning device is constructed for the processing of film types of different formats and comprises:

a movable platform constructed for the mechanical guiding and positioning of films of at least two different formats.

22. A system according to claim 1, wherein the order-specific accompanying data is at least one of order number, number of picture fields to be copied, number and format of the copies to be made, surface quality of the output medium, and desired output medium.

23. A system according to claim 1, wherein the input medium is developed photographic film.

24. A system according to claim 1, wherein the image data is processed before being stored in the data storage.

25. A system according to claim 1, wherein the output medium is a photographic print material.

26. Digital image processing system for outputting image data via output components, the system comprising:

an input device for the registration of digital image data from an input media and for the registration of order-specific accompanying data associated with the image data;

a data storage for temporary storage of the registered image data and the order-specific accompanying data;

an output device for outputting the image data; and a control device for controlling and connecting the input device, the data storage, and the output device, the control device managing and controlling the flow of data between said devices according to the order-specific accompanying data associated with the image data, wherein the output device includes at least two different output components which cooperate with the control device, the control device selectively feeding the image data temporarily stored in the data storage to different output components according to the order-specific accompanying data associated with the image data, said order-specific accompanying data specifying a desired output component for outputting the image data, and wherein the input device comprises:

at least one scanning device for the photoelectric scanning of each picture on the originals and for the generation of image data representing the originals.

27. Digital image processing system for outputting image data via output components, the system comprising:

an input device for the registration of digital image data from an input media and for the registration of order-specific accompanying data associated with the image data;

a data storage for temporary storage of the registered image data and the order-specific accompanying data;

an output device for outputting the image data; and a control device for controlling and connecting the input device, the data storage, and the output device, the control device managing and controlling the flow of data between said devices according to the order-specific accompanying data associated with the image data, wherein the output device includes at least two different output components which cooperate with the control device, the control device selectively feeding the image data temporarily stored in the data storage to different output components according to the order-specific accompanying data associated with the image data, said order-specific accompanying data specifying a desired output component for outputting the image data, and wherein the input device comprises:

at least one input module cooperating with the control device and including a developing device for photographic films as well as a scanning device for the photoelectric inline scanning of each picture of the developed films and for the generation of image data representing the originals included on the films.

28. Digital image processing system for outputting image data via output components, the system comprising:

an input device for the registration of digital image data from an input media and for the registration of order-specific accompanying data associated with the image data;

a data storage for temporary storage of the registered image data and the order-specific accompanying data;

an output device for outputting the image data; and a control device for controlling and connecting the input device, the data storage, and the output device, the control device managing and controlling the flow of data between said devices according to the order-specific accompanying data associated with the image data, wherein the output device includes at least two different output components which cooperate with the control device, the control device selectively feeding the image data temporarily stored in the data storage to different output components according to the order-specific accompanying data associated with the image data, said order-specific accompanying data specifying a desired output component for outputting the image data, and wherein one of the at least two different output components of the output device comprises:

at least one output module co-operating with the control device and including a development device for photographic print material as well as a digital exposure device for the in line projection of each picture of the image data temporarily stored in the data storage onto undeveloped photographic printing material.

29. Digital image processing system for outputting image data via output components, the system comprising:

an input device for the registration of digital image data from an input media and for the registration of order-specific accompanying data associated with the image data;

a data storage for temporary storage of the registered image data and the order-specific accompanying data;

an output device for outputting the image data; and a control device for controlling and connecting the input device, the data storage, and the output device, the control device managing and controlling the flow of data between said devices according to the order-specific accompanying data associated with the image data, wherein the output device includes at least two different output components which cooperate with the control device, the control device selectively feeding the image data temporarily stored in the data storage to different output components according to the order-specific accompanying data associated with the image data, said order-specific accompanying data specifying a desired output component for outputting the image data, and wherein the digital image processing system is constructed as a large scale laboratory system comprising:

a film-loading station, a film-developing and drying device, a photoelectric scanning device, a digital output module, and a controller for control thereof, wherein the loading station, the developing and drying device, and the photoelectric scanning device cooperate in line.

30. A large scale digital image processing system for producing copies on photographic copying material, comprising the following features:

an input device for the registration of digital image data, representing images to be produced, from a number of input media, and for the registration of accompanying data associated with the image data;

data storage for temporary storage of the registered, and as appropriate prepared, image data and accompanying data;

an output device for outputting the image data in a number of permanent output media, in particular a photographic copying material, a storage medium, a data line or the like;

a control device which controls and connects the input device, the data storage and the output device, and manages and controls the flow of data between said devices in accordance with the accompanying data associated with the image data;

said input device comprises a number of interfaces to an electronic data network for reading-in image data provided in said data network by said number of input media and as appropriate for reading-in accompanying data associated with the image data;

said output device comprises at least one interface for feeding the image data temporarily stored in the data storage and the accompanying data associated with said image data into the electronic data network; and a digital preparation device which is connected to said control device and cooperates with said control device for the registered image data, in order to convert said image data in view of the output on the number of permanent output media; wherein the converted image data are stored in the data storage, in order to output the converted image data, processed, on at least one of the number of image media in accordance with the accompanying data.

31. The system according to claim 30, wherein the number of input media comprises a developed photographic film, a data line, or a storage medium.

32. The system according to claim 30, wherein the number of permanent output media comprises a photographic copying material, a storage medium or a data line.

* * * * *